INVENTOR.
JOSEPH A. O'BRIEN
BY Morris Rabkin
ATTORNEY

United States Patent Office 3,014,656

Patented Dec. 26, 1961

3,014,656

COUNTING CIRCUIT

Joseph A. O'Brien, West Collingswood, N.J., assignor to Radio Corporation of America, a corporation of Delaware Filed Dec. 19, 1955, Ser. No. 553,926
19 Claims. (Cl. 235—92)

This invention relates to shift register counters.

It has been proposed to use shift registers to form decimal ring counters having ten stages of storage or trigger elements. Such counters have the disadvantage of requiring a large number of elements. In the alternative, binary type counters have been developed which effect some saving in the number of elements required, but which necessitate a ripple type carry which may inherently slow down the counting rate.

Recently magnetic elements have been successfully employed in shift registers and in ring counters. Workers in the art have sometimes termed magnetic elements as magnetic amplifiers, magnetic cores, or magnetic gates. The use of magnetic elements does result in simpler, more reliable circuits. In other applications, magnetic elements have been adapted to a binary type operation which effects some saving in elements required, but which still necessitates ripple carry as well as a relatively large number of elements. With ripple carry, correct parallel read out is not readily available.

Accordingly, it is an object of the present invention to provide a novel counter circuit using either magnetic or non-magnetic elements.

Another object of this invention is to provide a novel counter formed with magnetic elements, which counter is simpler and more reliable than those of the prior art.

A further object of this invention is to provide a decimal counter formed with a shift register, which counter operates at a high rate of speed.

Still another object of this invention is to provide with magnetic core elements a decimal counter, which counter provides a correct parallel read out which is immediately available after each count pulse.

An additional object of this invention is to provide a shift register counter coding having fewer elements, particularly when magnetic cores are used rather than the conventional counters.

A counter, in accordance with this invention, is formed by the use of a shift register of multiple elements. The outputs of certain ones of these elements forming the shift register are coupled to the input of the first element of the shift register through a matrix. This matrix functions, depending upon the output of the shift register, to selectively introduce a "one" into the first order element, that is, the lowest order stage of the shift register. The matrix therefore determines the sequence of combination of states (zero or one) through which the shift register storage elements progress for ten successive input triggers by the matrix logic. By varying the matrix, and thus the coding, a decimal counter having 4, 5, 6, 7, 8, 9, or 10 elements can be devised. Also, by varying the matrix, a desired radix may be selected, and different states of the register may be made to correspond to different digits in the radix selected. The invention is especially important in shift registers using magnetic elements.

In one embodiment requiring only five magnetic elements, the matrix is reduced to a simple inhibit gate receiving an inhibit input from the last element of the shift register.

The novel features of this invention, as well as the invention itself, both as to its organization and method of operation, will best be understood from the following description, when read in connection with the accompanying drawings, in which like reference numerals refer to like parts, in which.

Figure 1:
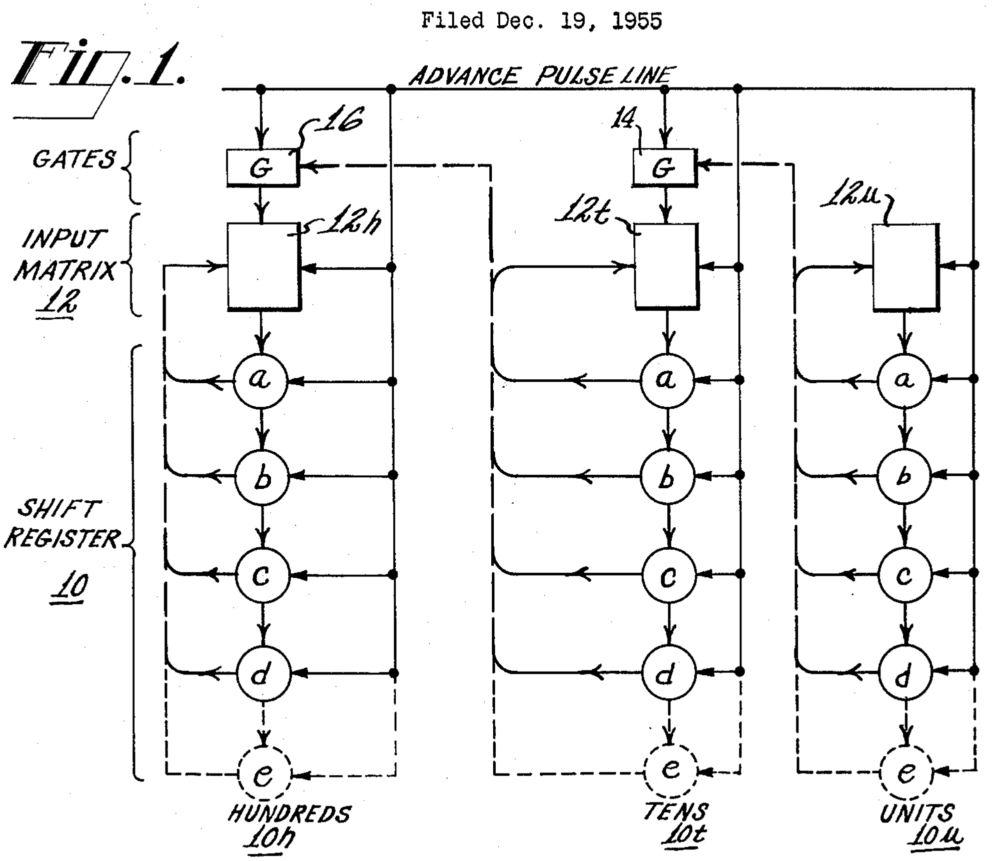
FIGURE 1 is a block diagram of a multistage decimal counter in accordance with this invention.

Referring to FIG. 1 a multistage decimal counter is illustrated by a block diagram. Each decimal order, units, tens, hundreds, etc., of the counter includes a magnetic shift register 10*u*, 10*t*, and 10*h*, respectively, and an input matrix 12*u*, 12*t*, and 12*h*, respectively, connected to the corresponding shift register 10*u*, 10*t*, or 10*h* for that particular decimal order. Magnetic core shift registers are now becoming well known in the art and may, for example, be of the delay gate type or of the one core per bit type. A magnetic shift register using one core per bit is, for example, described in an article bearing that same title by Kodis, Ruhman and Woo, found in the I.R.E., Convention Record, part 7, 1953, on pages 38–42. A description of the delay gate type magnetic shift register may be found in an article by R. A. Ramey, entitled "The Single Core Magnetic Amplifier as a Computer Element," published in the January 1953 edition of "Communications and Electronics" on pages 442–446.

Although either type shift register may be utilized, as mentioned above in this invention, a brief description of the construction and operation of a single line, one core per bit type shift register will be given for the sake of clarity and completeness.

Magnetic cores utilized in the magnetic shift register of FIG. 1 are of the type exhibiting a substantially rectangular hysteresis loop. Such cores may be made of a variety of materials among which are the various types of ferrites and various kinds of magnetic tapes including various kinds of metallic alloys. These materials may be given different heat treatments to effect different desired properties. In addition, the cores may be constructed in a number of different geometries including closed and open paths.

However, toroidal cores are usually employed. Each of the cores has at least an input winding, an output winding, and a shift winding. As described in the above-mentioned Kodis article, the shift winding of all the cores are arranged in series to form a single line shift register. A source of current pulses referred to as shift (or advance) is applied to the shift line. Saturation in the direction of the field applied by the shift pulse is defined as the "zero" state of the core; saturation in the opposite direction is defined as the "one" state. Application of the shift pulse clears all the cores to state zero, thus generating a voltage in the output winding of any core (storage element) which was previously state one. This voltage charges in an associated condenser (not shown) through a diode (not shown); after the read out, the condenser discharges through the succeeding core thereby writing a "one" into it. Thus the information is stored statically in each of the shift register elements and is advanced one stage with each application of the shift pulse, temporary storage being provided by the intercore link circuit.

However, other types of shift registers may be employed to advantage in practicing the invention. Therefore, the storage elements making up each of the shift registers for each decimal order of the counter of FIG. 1 have been merely designated by circles enclosing the small numerals *a*, *b*, *c*, and *d*. The input and output from each of the elements of the shift register is designated by arrows directed, respectively, into and out of the respective circles. A fifth shift register element "*e*" is indicated by dotted lines and finds use in an additional embodiment of this invention as will be described in more detail below. In the drawings of this invention multiple leads are indicated by dashed lines.

In the embodiment of this invention that is described in conjunction with FIG. 1, a four element shift register is utilized for each of the decimal orders of the counter. The outputs of certain of the storage elements *a*, *b*, *c*, and *d* are connected to the input matrix 12. In addition, the outputs of the shift register elements are connected to recognition gates 14 or 16, respectively. Recognition gates 14 and 16 may be no more than a logical configuration of diode "and" and "or" gates. The particular logical arrangement employed will vary depending upon the code employed in the shift register 10. The function of the recognition gates 14 and 16 is to recognize when the respective shift register 10*u* or 10*t* to which it is connected, reached nine. Suitable circuits for performing the functions of the gates 14 and 16 are described in chapters 2 and 3 of "Arithmetic Operations in Digital Computers," by R. K. Richards, published February 1955, by D. Van Nostrand Company, Inc.

As will be described below, one of the requirements of the code used is that the code have a repetitive cycle. In accordance with one code which may be employed to provide a repetitive cycle, the "*d*" storage element of each shift register 10*u*, 10*t*, and 10*h* must contain a "one" on the count of decimal nine, the remaining elements *a*, *b*, and *c* being a zero. In this event, only the output of the *d* storage element from, for example, the units shift register 10*u* would be connected to one input of the recognition gate 14. The second input to the recognition gates 14 and 16 is from the advance pulse line (indicated as such) from which the counting current pulses are obtained. Each advance pulse is also applied to the shift windings of the elements *a* through *e* of each of the registers 10*u*, 10*t* and 10*h*. Thus, when a decimal nine is present in the units magnetic shift register 10*u*, the recognition gate 14 passes the tenth advance pulse to the tens input matrix 12*t*. Each higher order digit or stage is similarly connected. Obviously, the advance pulses should be of sufficient time durations to allow recognition of nine in each lower order shift register. Also, the output is desirably coupled through a pulse amplifier to obtain sufficient power to drive the shift windings of the associated register.

Briefly, in operation, the shift register elements *a* to *d*, inclusive, connected in tandem, progress through a sequence of combination of states for 10 successive input triggers (advance pulses). The matrices 12 each determine the sequence of combinations. One form of input matrix is described hereinafter in connection with FIG. 3. Other suitable arrangements for the input matrices are described in the aforementioned textbook of R. K. Richards. For purposes of further description of the codings of the counter, only the units shift register 10*u* and input matrix 12*u* will be considered.

When a counter advance pulse is received the information in each storage element is shifted into the next storage location. The information that was previously stored in the last storage element "*d*" is not retained. Information initially in the first, second, and third storage elements *a*, B, and *c*, respectively, is shifted to the second, third, and fourth storage elements *b*, *c*, and *d*, respectively. As shifting takes place, the input matrix 12*u* senses the resulting outputs from each shift register element to ascertain the combination of states existing in the four storage elements *a*, *b*, *c*, and *d*, respectively. The logical configuration of the input matrix determines whether a pulse, that is a "one," is shifted into the first storage element.

Suitable rules may be established for appropriate sequences of ten code characters, that is, "words," each containing four "binary" digits or bits (i.e., one or zero as described above). Note that a pure binary code is not employed. The first requirement imposed on the sequence of words suitable for use in this counter is that each word be unique, i.e., one word may be used to represent only one decimal digit. The second requirement for the sequence of words is that successive words are formed by operating on the previous word *a*, *b*, *c*, and *d*, where *a*, *b*, *c*, and *d*, respectively, can be "zero" or "one." Information in the fourth core "*d*" in a four element shift register is not retained after shifting. The new positions *b*, *c*, and *d* of the second word correspond to the shifting of information from the first, second, and third cores *a*, *b*, and *c*, respectively, to the second, third, and fourth cores *b*, *c*, and *d*, respectively. Another restriction imposed on the choice of the coding for the words is imposed because the last word in the sequence representing decimal nine (the radix minus one) must cause the generation of the first word in the sequence, namely, decimal zero, when the next succeeding advance pulse is received.

Two additional considerations relate to minimizing the malfunction of the input matrix 12*u*. If the input matrix fails to generate a "one" when required, the resulting word may either represent some incorrect decimal digit or have no preassigned meaning. If the word is an incorrect digit, counting will proceed with an undetected error in the word. If the word has no preassigned meaning, a more difficult situation must be resolved. On the next advance pulse at input matrix 12, sensing the meaningless word may produce an incorrect decimal digit and proceed with an undetected error as above. Depending on the particular meaningless word and the configuration of the input matrix 12, a second meaningless word could be shifted into the storage locations.

Three different courses of action are possible when an unassigned word is encountered. First, the word may be ignored; this operation would continue as if the word represented a decimal digit. Secondly, the word could be recognized as an error without recognizing the count. The third alternative is to stop counting immediately.

It is also desirable for either case resetting the counter or to achieve some correspondence with existing codes that decimal zero be represented by the word 0000, corresponding to the storage elements *a*, *b*, *c*, and *d*, respectively. To summarize, the sequence of ten words of four bits each meet the requirements of uniqueness, succession, repetitive cycle, and use of 0000.

There are a number of such codes which may be quickly ascertained by one skilled in the art which will meet these requirements. It may readily be shown that of the four bits which may be chosen sixteen different ways, seven codes may be devised which have ten unique words and also meet the other requirements set forth above. A particular code which will result in the minimum number of "and" gate and "or" circuit components in the input matrix 12*u* is set forth below.

| Decimal No. | Shift Register Elements | | | |
|---|---|---|---|---|
| | d | c | b | a |
| 0 | 0 | 0 | 0 | 0 |
| 1 | 0 | 0 | 0 | 1 |
| 2 | 0 | 0 | 1 | 1 |
| 3 | 0 | 1 | 1 | 0 |
| 4 | 1 | 1 | 0 | 1 |
| 5 | 1 | 0 | 1 | 1 |
| 6 | 0 | 1 | 1 | 1 |
| 7 | 1 | 1 | 1 | 0 |
| 8 | 1 | 1 | 0 | 0 |
| 9 | 1 | 0 | 0 | 0 |

Using this particular code arrangement, the recognition gates 14 and 16 each may be an inhibitor gate having the preceding register outputs *a*, *b* and *c* connected to its inhibitor input and having the *d* output and the advance lines connected in logical "and" fashion to its other input.

Thus, during any advance pulse, the recognition gate 14 produces an output when and only when the register 10*u*, *a*, *b* and *c* outputs are "0" and the *d* output is a "1" corresponding to the four bit code arrangement.

The logical expression utilizing Boolean algebra which corresponds to an input matrix 12*u* which produces the above code may be set forth by $I=a'd'+ad+ab'$. In this expression, I represents the output of the input matrix 12, the non-prime letters represent the output of each of the storage elements of the shift register 10, and the primed letters represent the complemented output (herein termed inhibit output as will be later described) of the respective storage elements *a* through *d*, inclusive.

If desired, in accordance with the well known mathematical techniques the input matrix 12 may be designed to sense errors occurring in the shift register 10. This matrix circuitry, for example, could sense all possible unassigned code words and generate an error signal to either stop the code or give an error alarm. As an alternate approach, the error detecting counter could place additional logical circuitry in the input matrix to assure that a malfunction of the error signal generator will assure a succession of meaningless code words. Error detection systems are described in the textbook by R. K. Richards referred to above.

Figure 2:
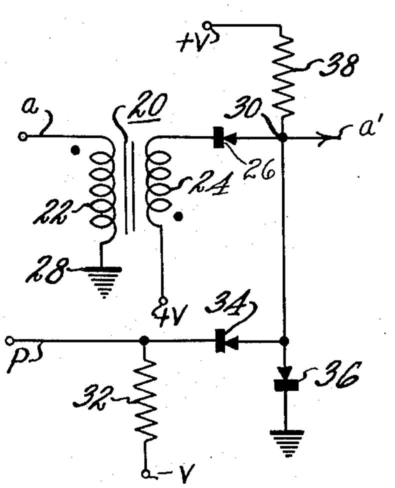
FIGURE 2 is a circuit diagram of an inhibit gate which may be employed to provide inhibit inputs to the matrix of FIGURE 1 or as the input matrix, per se, in a preferred embodiment of this invention; and, FIGURE 3 is a circuit diagram of the input matrix of FIGURE 1 for a particular code adapted to a four element shift register decimal counter.

The inhibit signals $a'$, $b'$, $c'$, and $d'$, respectively, are required to be in synchronism with the advance (count) pulses. There are many possible solutions to this, one of which is illustrated in FIG. 2. In the circuit of FIG. 2, two inputs, one, for example, from the output of the "*a*" storage element of the shift register 10*u*, and a second input labeled P from the advance current pulse line of FIG. 1 are illustrated. The "*a*" input to the circuit is coupled to a transformer 20 having a primary 22 and a secondary 24 whose polarities are indicated by the dots. The "*a*" input is coupled through the primary winding 22, the transformer 20 to ground 28. The secondary 24 of the transformer 20 is coupled between a source of positive voltage +V and the cathode of a diode 26. With the polarities indicated, a positive signal at the "*a*" input produces a negative output signal in the secondary winding 24. The anode of the diode 26 is connected to a common point 30 and the output $a'$ is taken from the common point 30. The advance pulse P input is coupled through a resistor 32 to a source of negative voltage −V and to the cathode of a diode 34. The anode of the diode 34 is connected through the anode side of a diode 36 to ground 28 and to the common point 30. Finally, the common point 30 is connected through the resistor 38 to a source of positive voltage +V.

In operation, the inhibit gate, illustrated in FIG. 2, provides a clocked output upon the occurrence of each advance pulse P in the absence of an input "*a*." The converse is also true, that is, the inhibit gates provides no output upon the occurrence of each advance pulse P in the presence of an input "*a*." Thus,by way of example, if the first magnetic element "*a*" of the shift register 12*u* (FIG. 1) contains a stored "one" on the occurrence of an advance pulse, an output is provided to the "*a*" input of the inhibit gate of FIG. 2. In quiescent condition, the inhibit gate of FIG. 2 maintains a path of conduction from the positive potential source +V through the resistor 38, diode 34, and resistor 32 to the source of negative potential −V. Thus, the $a'$ (inhibit) output maintains a voltage level somewhat negative with respect to zero. The occurrence now of the advance pulse P blocks conduction through the diode 34, thereby effecting a rise in voltage of the common point 30 which is the $a'$ inhibit output. However, with the occurrence of the positive input "*a*," a negative pulse is created in the secondary winding 24 of the transformer 20, thereby maintaining conduction from the source of positive potential +V through resistor 38 and diode 26. Thus the common point 30 is maintained at its negative potential and no output occurs. In the absence of an "*a*" input, the common point 30 would rise up to ground level, thereby creating a positive pulse which is clamped at ground by the action of diode 36. To summarize, the inhibit gate of FIG. 2 provides the complementing function of its input.

Another type of inhibit gate utilizing magnetic cores which is adaptable for use with this invention is described in an article entitled "Logic and Control Functions Performed with Magnetic Cores" by Gutterman, Kodis, and Ruhman which may be found in the March 1955 issue of the "Proceedings of the I.R.E.," page 292.

Figure 3:
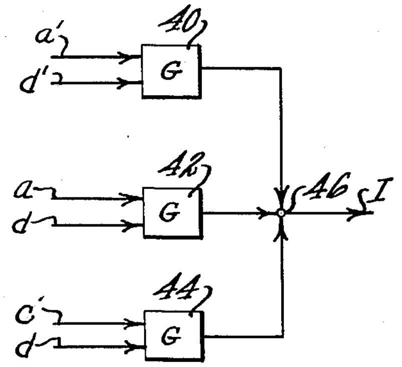

Referring to FIG. 3, the implementation of the Boolean expression of $I=a'd'+ad+ab'$ which, as mentioned above, results in a minimum number of components of certain types in the input matrix 12 is illustrated. In accordance with this implementation, three "and" gates 40, 42, and 44 are required, receiving respective inputs $a'$ and $d'$, *a* and *d*, $c'$ and $d'$ from the shift register 10*u*. The primed outputs, of course, are the inhibit outputs which may be derived from the circuit of FIG. 2. Thus, where an inhibit (or primed) input is indicated by the above Boolean expression, an inhibit gate (FIG. 2) is coupled to the output of that storage element. The inhibit gate of FIGURE 2 may be coupled to the output of each storage element or may be included as part of the recognition gates 14, 16, and the input matrices 12, as desired. The "or" gate 46 is symbolically represented by a circle having arrows directed to the center thereof. The "or" gate, sometimes known as buffer gate, provides an output from the presence of inputs from any one of its inputs. Thus "or" gate 46 will provide an output I when any of the "and" gates 40, 42, or 44, respectively, provide an output.

By way of summary, a decimal counter comprising a shift register having only four storage elements has been devised by coupling the output of each of these storage elements *a*, *b*, *c*, and *d*, respectively, back through an input matrix 14*u* to the input of the first element "*a*." In this manner, the logical configuration of the input matrix determines whether a "one" or a "zero" is to be entered in the first storage element, depending upon the particular code selected. The code must meet the requirements of uniqueness, succession, and repetitive cycle. In this manner, correct parallel read from the elements *a* through *d* is immediately available with the occurence of each advance pulse and the counter is simple and reliable. A multistage decimal counter can readily be constructed by this technique wherein ripple carry is avoided in a particular decimal digit column.

In the alternative, decimal zero may be represented by a code word other than 0000. This representation is particularly desired when certain error control codings are employed in which decimal zero is different from 0000. In fact 0000 may not be used to represent any decimal number. Thus a number of coded sequences may be built up which do not use zero. For example, each of the sequences may start with decimal zero being 0001, 0010, or 0011. Starting with any of these code words, which represent 1, 2, and 3 respectively, in a pure binary code at any point in a sequence, the chosen word, where N is the binary value, can be followed by $\text{Modulo}_{16}(2N)$ or $\text{Modulo}_{16}(2N+1)$. Successive applications of these rules may be used to complete all possible code sequences not using zero. To obtain the code, the numbers N are simply converted to binary form to obtain the representation for the shift register 10. Utilizing these formulas at least ten codes may be built up not using 0000 which meet the remaining requirements of uniqueness, succession, and repetition.

A shift register decimal counter may consist of five storage elements. The fifth of these elements is indicated in FIG. 1 by the dotted circle *e*. Otherwise the construction of the counter remains as described above. Another code is now required. Codes may be readily constructed meeting the criteria set forth above of having unique, successive words that form a repeating group of ten words.

Codes having decimal zero as the equivalent of 00000 may be again preferred. The input matrix 12 may thus be constructed to conform to different Boolean algebra expressions for different codes which comply with the above criteria. Where I is the output of the input matrix 12*u*, the Boolean expressions governing the construction of the matrices may be expressed as:

$$I_1=a'b'd'e'+ad$$
$$I_2=e'[ab+(a'+c)d']$$
$$I_3=b'c'd'e'+cd$$
$$I_4=ab'+e'(a'c'+cd')$$
$$I_5=e'(a'b+c'd')$$
$$I_6=e'$$

It is noted that the input matrix for the Boolean expression of $I_6$ is the simplest of the six codes to implement. The input matrix constructed to correspond to the $I_6$ expression may be a simple inhibit gate of the type shown in FIG. 2. A detailed description of the construction of suitable circuits corresponding to the $I_1$–$I_5$ expressions may be found in the above referenced textbook by R. K. Richards, chapters 2 and 3.

By way of example, the code generated by an inhibit gate for the input from the "*e*" storage element may be as follows:

| Decimal No. | Shift Register Elements | | | | |
|---|---|---|---|---|---|
| | e | d | c | b | a |
| 0 | 0 | 0 | 0 | 0 | 0 |
| 1 | 0 | 0 | 0 | 0 | 1 |
| 2 | 0 | 0 | 0 | 1 | 1 |
| 3 | 0 | 0 | 1 | 1 | 1 |
| 4 | 0 | 1 | 1 | 1 | 1 |
| 5 | 1 | 1 | 1 | 1 | 1 |
| 6 | 1 | 1 | 1 | 1 | 0 |
| 7 | 1 | 1 | 1 | 0 | 0 |
| 8 | 1 | 1 | 0 | 0 | 0 |
| 9 | 1 | 0 | 0 | 0 | 0 |

As in the case of the four element counter, other codes may be devised wherein decimal zero is not represented by all zeros. In fact, in two other interesting codes, the input matrix required may also be a simple inhibit gate. In the first of these two, decimal zero is represented by a single "one" for the "*b*" storage element (all other digits being "zero"); and in the second of these two by a single "one" for the "*c*" storage element (all other digits being zero).

Following the principles set forth above, other shift register counters and codes therefor, may be constructed having 6, 7, 8, 9, or 10 storage elements.

It may be desirable to utilize a translator to translate from the particular code employed to the pure binary or some other system. By way of illustration, to convert the $I_6$ code set forth above to a pure binary representation, the $2^3$ binary bit (the expression $2^{N-1}$ designates the Nth order bit) is ascertained from the Boolean expression $c'e$. This expression may correspond to an "and" gate receiving a direct input from the "*e*" storage element and a direct input from the "*c*" storage element. In a similar manner, the $2^2$ binary bit is ascertained from the Boolean expression $cd$, the $2^1$ binary bit by the Boolean expression $a'c+bd'$ and finally the $2^0$ bit by the Boolean expression $cd'+(b+e)(a+d')$.

There has been shown and described hereinabove a counter that utilizes shift register elements rather than triggered two-state elements. Ripple carry is avoided in a particular decimal digit column. Correct parallel read out is immediately available after each advance (count) pulse. The use of magnetic core circuits to provide a shift register counter in this manner provides a simpler, reliable, and fast acting counter.

What is claimed is:

1. A counter comprising a shift register having a plurality of outputs and an input, and an input matrix responsive to certain of said outputs for selectivity providing signals to said shift register input.

2. A counter comprising a magnetic shift register having a plurality of outputs and an input, and an input matrix responsive to certain of said outputs for selectively providing signals to said shift register input.

3. A counter comprising a shift register having five stages, said register having an input and each of said stages having an output, and an input matrix coupled to certain of said outputs for selectively providing signals to said register input.

4. A counter comprising a shift register having five stages, said register having an input and each of said stages having an output, means for receiving pulses to be counted by said counter, and an input matrix coupled to certain of said outputs for selectively providing signals to said register input, said matrix and each of said stages being responsive to said pulses.

5. A counter comprising a shift register having five stages, said register having an input and each of said stages having an output, and an input matrix coupled to certain of said outputs for selectively providing signals to said register input, said input matrix comprising a single inhibit gate.

6. A counter comprising, in combination, a magnetic shift register, said register having a first, second, third, fourth, and fifth magnetic storage element, means for receiving pulses to be counted by said counter, and an input matrix responsive to certain of said storage elements for selectively providing signals to the input of said first storage element, said matrix and each of said storage elements being responsive to said count pulses.

7. A counter comprising a magnetic shift register, said register having four magnetic storage elements, an input matrix responsive to certain of said storage elements for selectively providing signals to the input of said shift register, and means for receiving shift pulses to be counted by said counter, said matrix and each of said magnetic cores being responsive to said shift pulses.

8. A decimal counter comprising a magnetic shift register, said register having four magnetic storage elements, an input matrix responsive to certain of said storage elements for selectively providing signals to the input of said shift register, and means for receiving shift pulses to be counted by said counter, said matrix and each of said magnetic cores being responsive to said shift pulses.

9. A counter comprising a plurality of magnetic cores connected as a magnetic shift register, means for receiving pulses to be counted by said counter, and an input matrix responsive to certain of said storage elements for selectively providing signals to the input of said shift register, said shift register and said matrix being responsive to said pulses to advance said signals in said shift register.

10. A counter comprising a shift register having an input and having a plurality of elements each comprising a magnetic core, means for receiving shift pulses to be counted by said counter, and an input matrix responsive to certain of said magnetic cores for selectively providing signals to said shift register input, said shift register and said matrix each being responsive to said pulses to advance said signals in said shift register.

11. A counter comprising first, second, third, fourth, and fifth magnetic storage elements connected as a magnetic shift register, means for receiving shift pulses to be counted by said counter, and an input matrix responsive to certain of said storage elements for selectively providing signals to the input of said first storage element, said matrix and each of said storage elements being responsive to said shift pulses, said input matrix comprising an inhibit gate.

12. A decimal counter comprising a shift register having first, second, third, fourth, and fifth magnetic storage elements, means for receiving advance pulses to be counted by said counter, and an input matrix responsive to certain of said storage elements for selectively providing signals to said first storage element, said matrix and each of said storage elements being responsive to said shift pulses, said input matrix comprising an inhibit gate.

13. A counter comprising first, second, third, and fourth magnetic storage elements connected as a magnetic shift register, means for receiving shift pulses to be counted by said counter, and an input matrix responsive to certain of said storage elements for selectively providing signals to the input of said first storage element, said matrix and each of said storage elements being responsive to said shift pulses.

14. A counter, comprising, in combination, a first, second, third, fourth, and fifth magnetic storage element, said storage elements being connected to form a magnetic shift register, means for receiving pulses to be counted by said counter, and an input matrix responsive to certain of said storage elements for selectively providing signals to the input of said first storage element, said matrix and each of said storage elements being responsive to said count pulses, and said input matrix comprising an inhibit gate connected to the output of said fifth storage element.

15. A counter, comprising, in combination, a first, second, third, fourth, and fifth magnetic amplifier, said amplifiers being connected to form a magnetic shift register, means for receiving pulses to be counted by said counter, and an input matrix responsive to certain of said amplifiers for selectively providing signals to the input of said first amplifier, said matrix and each of said amplifiers being responsive to said count pulses, and said input matrix comprising an inhibit gate connected to the output of said fifth amplifier.

16. A decimal counter comprising in combination a magnetic core shift register, said shift register having an input and a plurality of outputs, means providing shift pulses for shifting information through said shift register, an input matrix responsive to the coincidence of said shift pulses and certain of said outputs of said shift register for selectively introducing said information to said input of said shift register.

17. A decimal counter comprising in combination a magnetic core shift register, means for receiving shift pulses for shifting information through said shift register, an input matrix responsive to the coincidence of said shift pulses and certain of the outputs of said shift register for selectively introducing said information into the input of said shift register to form, responsive to said shift pulses, successive coded arrangements of said information which are unique and repetitive every ten shift pulses.

18. A counter comprising a pluraltiy of magnetic amplifiers arranged in a shift register circuit, said amplifiers each having an input and an output, the output of any one of said amplifiers being coupled to the input of the next succeeding one of said amplifiers, an input matrix, certain of the outputs of said amplifiers being coupled to the input of said input matrix, the output of said matrix being connected to said input of the first one of said amplifiers.

19. A multistage decimal counter comprising in combination a plurality of magnetic core shift registers, a different one of said shift registers corresponding to each of said decimal stages, each of said stages also including an input matrix connected to the input of said shift register, said matrix being coupled to the output of certain of said shift register cores for selectively providing information to the input of said shift register, means for receiving shift pulses corresponding to signals to be counted by said counter, said shift register of the lowest order decimal stage being connected to said source of shift pulses, and gating means for selectively connecting said source of shift pulses to each of said shift registers upon the shift register for a lower order stage reaching the count of nine.

References Cited in the file of this patent

UNITED STATES PATENTS

| | | |
|---|---|---|
| 2,604,263 | MacSorley | July 22, 1952 |
| 2,630,969 | Schmidt | Mar. 10, 1953 |
| 2,690,303 | Nolde et al. | Sept. 28, 1954 |
| 2,729,774 | Steele | Jan. 3, 1956 |
| 2,731,203 | Miles | Jan. 17, 1956 |
| 2,735,021 | Nilssen | Feb. 14, 1956 |
| 2,788,940 | Terry et al. | Apr. 16, 1957 |
| 2,794,130 | Newhouse et al. | May 28, 1957 |
| 2,870,436 | Kuder | Jan. 20, 1959 |
| 2,896,848 | Miehle | July 28, 1959 |